United States Patent [19]

Crandell

[11] 3,945,728

[45] Mar. 23, 1976

[54] ALARM FOR AN ELECTROPHOTOGRAPHIC PRINTING MACHINE

[75] Inventor: Melvin G. Crandell, Walworth, N.Y.

[73] Assignee: Xerox Corporation, Stamford, Conn.

[22] Filed: Nov. 8, 1974

[21] Appl. No.: 522,000

[52] U.S. Cl. .................... 355/75; 194/9 T; 340/280

[51] Int. Cl.[2] ........................................ G03B 27/62

[58] Field of Search ........... 355/75, 76, 69, 115, 14; 194/9 T; 340/267 R, 280, 309.1; 346/14 MR

[56] References Cited

UNITED STATES PATENTS

| | | | |
|---|---|---|---|
| 1,161,683 | 11/1915 | Hutter | 355/115 |
| 3,378,831 | 4/1968 | Metcalf | 340/280 X |
| 3,380,064 | 4/1968 | Norris et al. | 346/14 MR UX |
| 3,765,759 | 10/1973 | Yamada | 355/45 |

*Primary Examiner*—Richard A. Wintercorn
*Attorney, Agent, or Firm*—H. Fleischer; J. J. Ralabate; C. A. Green

[57] ABSTRACT

An apparatus in which the failure to remove an original document from a housing after the elapse of a preselected duration of time is detected.

8 Claims, 3 Drawing Figures

ALARM FOR AN ELECTROPHOTOGRAPHIC PRINTING MACHINE

The foregoing abstract is neither intended to define the invention disclosed in the specification, nor is it intended to be limiting as to the scope of the invention in any way.

BACKGROUND OF THE INVENTION

This invention relates generally to an electrophotographic printing machine, and more particularly concerns an apparatus for detecting the presence of an original document on the platen thereof.

In the process of electrophotographic printing, for example, as disclosed in U.S. Pat. No. 2,297,691 issued to Carlson in 1942, a photoconductive member is charged to a substantially uniform potential in order to sensitize its surface. The charged photoconductive surface is then exposed to a flowing light image of the original document being reproduced. Exposing the charged photoconductive surface to the light image selectively dissipates the charge in the irradiated areas. This records an electrostatic latent image of the original document on the photoconductive surface. The electrostatic latent image is developed by bringing a developer mix of carrier granules and toner particles into contact therewith. Thereafter, the toner powder image is transferred from the photoconductive member to a sheet of support material, such as plain paper, to which it is permanently affixed by the suitable application of heat thereto. In this manner, a copy of the original document is formed. Frequently, the original document being reproduced is left on the platen of the printing machine after the copy is reproduced. Herein before, there was no indication that the operator had left the original document in the electrophotographic printing machine. Thus, when operators returned to their work stations with the copy, the original document was frequently lost.

Accordingly, it is a primary object of the present invention to improve electrophotographic printing machines by providing an indication to the operator that the original document has been left therein after the requisite number of copies have been reproduced.

SUMMARY OF THE INVENTION

Briefly stated, and in accordance with the present invention, there is provided an apparatus for housing an original document.

Pursuant to the features of the present invention, the appratus includes means for supporting the original document. In addition, means are provided for detecting the failure to remove the original document from the supporting means after the elapse of a preselected duration of time.

BRIEF DESCRIPTION OF THE DRAWINGS

Other objects and advantages of the present invention will become apparent upon reading the following detailed description and upon reference to the drawings, in which.

While the present invention will be described in connection with a preferred embodiment thereof, it will be understood that it is not intended to limit the invention to that embodiment. On the contrary, it is intended to cover all alternatives, modifications and equivalents that may be included within the spirit and scope of the invention as defined by the appended claims.

DETAILED DESCRIPTION OF THE INVENTION

Figure 1:
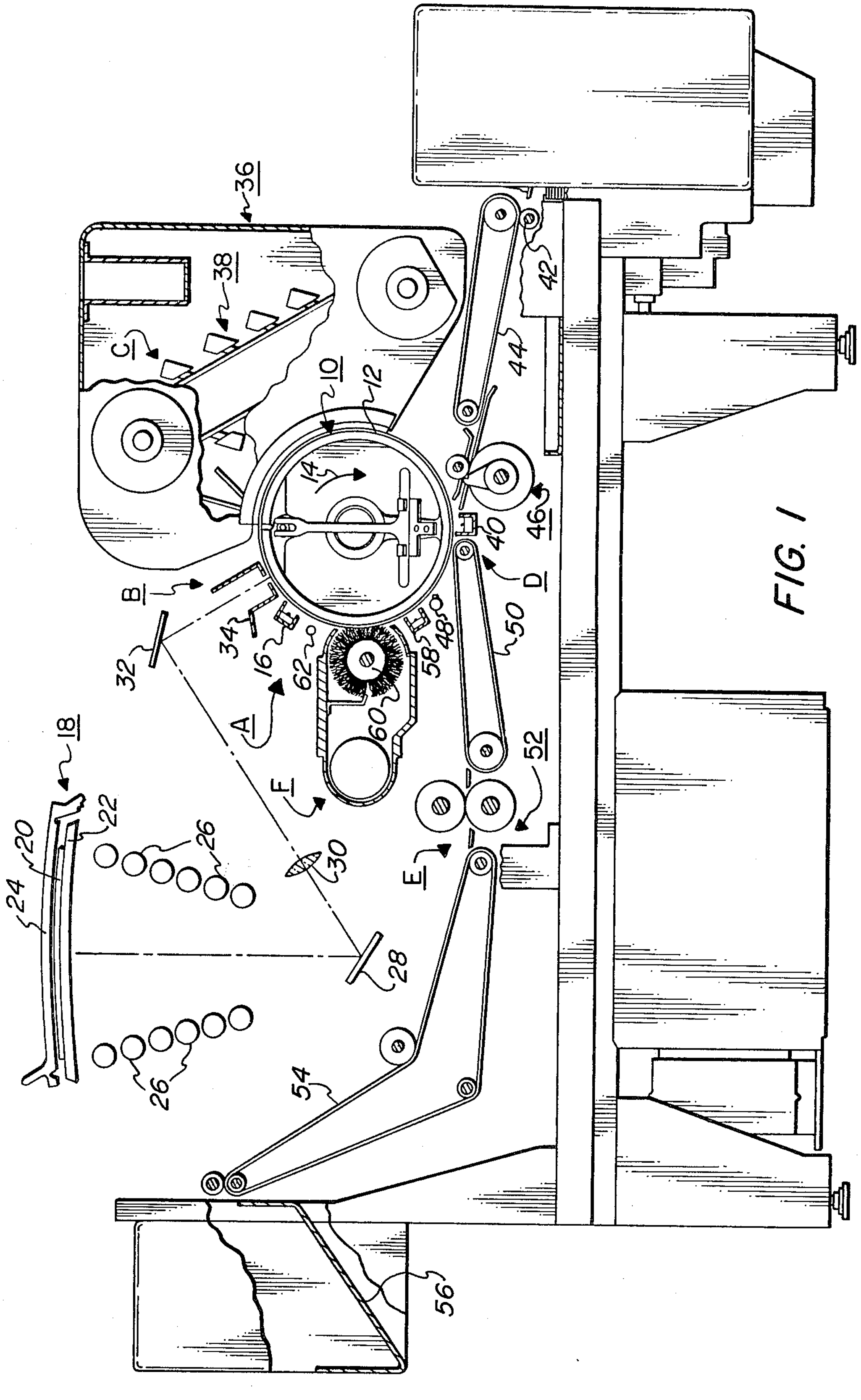
FIG. 1 is a schematic elevational view of an electrophotographic printing machine incorporating the features of the present invention therein.

For a general understanding of an electrophotographic printing machine in which the present invention may be incorporated, reference is had to FIG. 1, which depicts schematically the various components thereof. Hereinafter, like reference numerals will be employed throughout to designate like elements. Although the apparatus for detecting the failure to remove the original document from an electrophotographic printing machine is particularly well adapted for use therein, it should become evident from the following discussion that it is equally well suited for use in a wide variety of devices and is not necessarily limited in its application to the particular embodiment shown herein.

As in all electrophotographic systems of the type illustrated, an image bearing member having a drum 10 with a photoconductive surface 12 entrained about and secured to the exterior circumferential surface thereof is rotated, in the direction of arrow 14, through a series of processing stations. By way of example, photoconductive surface 12 may be made preferably from a suitable selenium alloy.

The processing stations will be described briefly hereinafter.

Initially, drum 10 rotates successive portions of photoconductive surface 12 through charging station A. Charging station A employs a corona generating device, indicated generally at 16, to sensitize photoconductive surface 12. Corona generating device 16 is positioned closely adjacent to photoconductive surface 12 so as to charge it to a relatively high, substantially uniform potential. U.S. Pat. No. 2,836,725 issued to Vyverburg in 1958 is exemplary of the type of corona genrating device that may be employed.

Thereafter, drum 10 rotates the charged portion of photoconductive surface 12 to exposure station B. Exposure station B includes a housing member, indicated generally by the reference numeral 18, for holding original document 20. Housing member 18 includes supporting means 22 and cover member 24. The detailed structural configuration of housing member 18 will be described hereinafter with reference to FIG. 2. However, it should be noted that housing member 18 includes suitable circuitry for indicating that original document 20 has not been removed from supporting means 22 after the elapse of a pre-selected duration of time. Lamps 26 illuminate original document 20 located in housing member 18. Scanning of original document 20 is achieved by oscillating mirror 28 in a timed relationship with the movement of drum 10. Mirror 28 is positioned beneath housing member 18 to reflect the light image of original document 20 through spherical lens 30 onto mirror 32 which, in turn, transmits the light image through apertures slit 34 onto charged photoconductive surface 12. Irradiation of charged photoconductive surface 12 records an electrostatic latent image thereon corresponding to the original document.

After exposure, drum 10 rotates the electrostatic latent image recorded on photoconductive surface 12 to the development station C. Development station C includes development apparatus 36 comprising an enclosure having a lower sump for accumulating a developer mix of carrier granules and toner particles. Bucket conveyor 38 is employed to move the developer mix from the lower sump to the upper region thereof, where it is cascaded in the downwardly direction over the electrostatic latent image recorded on photoconductive surface 12. In this manner, the toner particles are electrostatically attracted to the latent image forming a toner powder image on photoconductive surface 12.

With continued reference to FIG. 1, a sheet of support material is advanced by the sheet feeding apparatus to transfer station D. At transfer station D, a corona generating device indicated generally by the reference numeral 40, is arranged to spray ions onto the back side of the sheet of support material which may be a plain sheet of paper or a thermoplastic sheet, to attract the toner powder image from photoconductive surface 12 thereto.

Prior to proceeding with the description of the remaaining processing stations, the sheet feeding apparatus will be briefly described hereinafter.

As shown in FIG. 1, the sheet feeding apparatus includes vacuum feeders to advance the uppermost sheet of the stack of sheets to roller 42. Roller 42 cooperates with the belts of paper transport 44 for advancing the sheet of support material to sheet registration device 46. Sheet registration device 46 is located adjacent to drum 10 so as to arrest and align successive advancing sheets of support material. Thereafter, sheet registration device 46 advances the sheet of support material into contact with photoconductive surface 12, in a timed relationship with the movement of drum 10, so that the toner powder image thereon is interposed between photoconductive surface 12 and the sheet of support material. In this way, corona generating device 40 attracts the toner powder image from photoconductive surface 12 to the sheet of support material.

After transferring the toner powder image to the sheet of support material, stripping device 48 produces a flow of periodically pulsated pressurized air which separates the sheet of support material from photoconductive surface 12. After the sheet of support material is separated from photoconductive surface 12, endless belt conveyor 50 advances it to fusing station E.

At fusing station E, a suitable fusing apparatus, generally indicated by the reference numeral 52, generates sufficient heat to permanently affix the toner powder image to the sheet of support material. After the toner powder image is permanently affixed to the sheet of support material, conveyor 54 advances it to catch tray 56 enabling the machine operator to readily remove the finished copy from the printing machine.

Continuing now with the remaining processing stations, invariably after the sheet of support material is stripped from photoconductive surface 12, residual toner particles adhere thereto. These residual toner particles are removed from photoconductive surface 12 at cleaning station F. Initially, the toner particles are brought under the influence of a corona generating device 58 which neutralizes the remaining electrostatic charge on photoconductive surface 12 and the residual toner particles. The neutralized toner particles are cleaned from photoconductive surface 12 by a rotatably mounted fibrous brush 60 in contact therewith.

Subsequent to cleaning, discharge lamp 62 floods photoconductive surface 12 with light to dissipate any residual electrostatic charge remaining thereon prior to the initiation of the next successive cycle.

It is believed that the foregoing description is sufficient for purposes of the present application to illlustrate the general operation of an electrophotographic printing machine.

Figure 2:
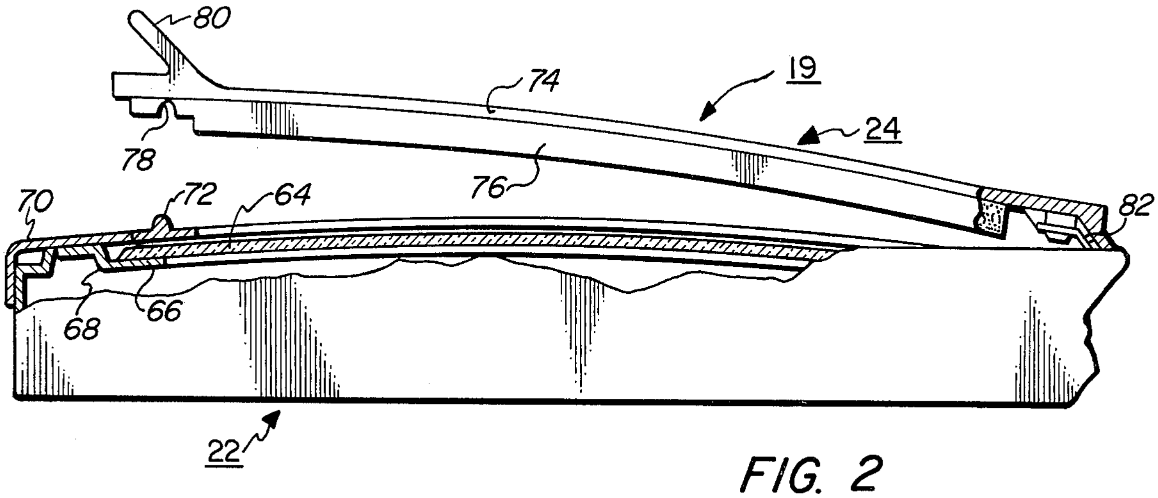
FIG. 2 is an elevational view, partially in section, depicting the FIG. 1 printing machine housing for the original document being reproduced.

Referring now to the specific matter of the present invention, FIG. 2 depicts housing member 18 in greater detail. Support means 22, preferably, includes a substantially rectangular curved transparent member 64, made of glass, which is secured by suitable means to the frame of the electrophotographic printing machine depicted in FIG. 1. Transparent member or platen 64 rests upon resilient means or a soft edge gasket 66 which is secured to a horizontally dependent flange 68 of the rigid machine frame. A plate 70, affixed to the machine frame, is placed thereover and provided with an opening therein to expose the top surface of platen 64. Switch 72 is disposed upon platen 64 and adapted to engage the leading or trailing edge of original document 20 disposed thereon in the margin or non-image region. Switch 72 is normally opened. However, with original document 20 being disposed upon platen 64 and cover member 24 being in the closed position, switch 72 is actuated indicating the presence of original document 20 upon platen 64. It should be noted that switch 72 is a highly sensitive switch having a low spring constant. This is due to the fact that the beam strength of the paper must be capable of closing switch 72 when cover member 24 is closed.

Cover member 24 is mounted pivotably along one edge of support 22 and includes a substantially rigid continuous outer shell 74 having affixed thereto a resilient sheet member 76 made of an elastomeric material such as a soft rubber-like backing. Resilient sheet member 76 may be fabricated from either a natural rubber or any number of commercially available synthetic rubbers, e.g. foam polyurethane which is affixed to outer shell 74 by means of a suitable adhesive. The outer surface of sheet 76 is preferably colored white to provide a suitable reflective surface for the light rays impinging thereon. Sheet 76 has an aperture or notch 68 therein. Notch 78 is adapted to mate with the switch 72. In this way, when cover member 24 is closed without original document 20 being positioned upon platen 64, switch 72 will remain in the opened position. However, when original document 20 is disposed upon platen 64 and cover member 24 is closed, original document 20 will be supported in all areas around switch 72 by sheet member 76 and the beam strength of optical document 20 will close switch 72. A handle 80 is provided at the free end of cover member 24 and provides a means by which cover member 24 can be raised or lowered. To permit cover member 24 to be raised over large objects to be reproduced, such as books, while still permitting cover member 24 to lie in a plane substantially parallel to platen 64, cover member 24 is double hinged. Double hinge 82 is secured to cover member 24 at the end thereof opposed from handle 80. A suitable double hinge is described in U.S. Pat. No. 3,062,110 issued to Shepardson et al. in 1962.

The present invention includes detecting means for determining the failure to remove the original document from platen 64 after the elapse of a pre-selected duration of time. Switch 72 is one element of the electrical circuitry for detecting the failure to remove the original document from platen 64. One embodiment of an electrical circuit for accomplishing the foregoing is shown schematically in FIG. 3. One skilled in the art will recognize that many variations and modifications of this circuit may be employed to achieve similar results.

Figure 3:
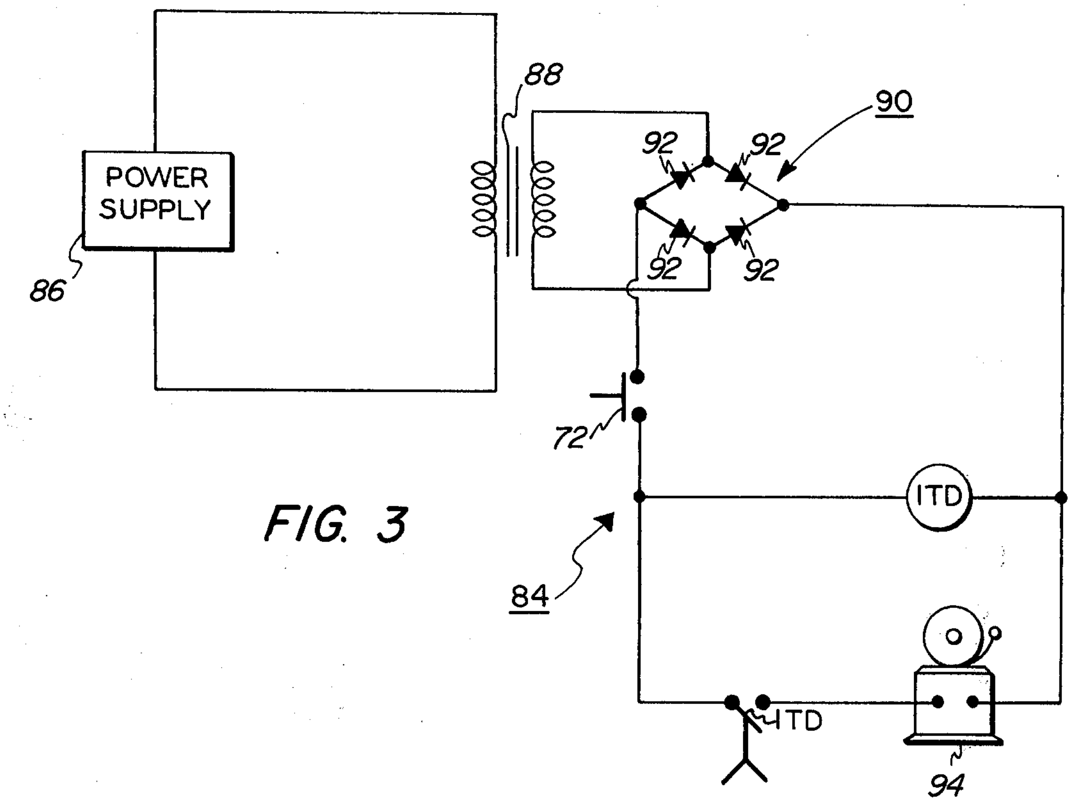
FIG. 3 is a schematic representation of a circuit providing an indication that the original document remained in the housing after the elapse of a preselected duration of time.

Turning now to FIG. 3, detecting means, indicated generally at 84, includes a power supply 86. Preferably, power supply 86 generates about 115 volts A.C. Step-down transformer 88, electrically coupled to power supply 86, converts the 115 volts A.C. to preferably about 24 volts A.C. The electrical output from transformer 88 is coupled to bridge rectifier circuit 90. Bridge rectifier circuit 90 includes a plurality of diodes 92 arranged in a bridge circuit. Rectifier circuit 90 converts the 24 volt A.C. input to a D.C. output. Switch 72 is normally in an opened position. However, when original document 20 is disposed upon platen 64 and cover member 24 is closed, switch 72 is closed. Switch 72 is electrically connected to rectifier circuit 90. The output from switch 72 actuates time relay 1TD. Normal opened switch 1TD and bell 94 are connected electrically in parallel with time delay relay 1TD. After the elapse of a pre-selected duration of time, time delay relay 1TD closes switch 1TD. When switch 72 and switch 1TD are closed, bell 94 is energized alerting the machine operator that the original document has not been removed from platen 64. Removal of the original document from platen 64 opens switch 72 which, in turn, de-energizes time relay 1TD and switch 1TD returns to the normally opened position. In this way, bell 94 is de-energized. It should be noted that the foregoing procedure may also be employed to reset this circuit if bell 94 is energized during a long copy run. This selected duration of time that the original document may remain on platen 64 without exciting bell 94 is determined by a judicious selection of time delay 1TD. The time delay, in turn, is dependent upon the machine speed and the number of copies produced thereby. By way of example, if the machine is capable of producing 3600 copies per hour, or 60 copies per minute, the time delay might be set at about two minutes. To this end, 120 copies of the same original may be formed before the time delay relay 1TD will energize switch 1TD which, in turn, excites bell 94. In the event that a greater length of time or a lesser length of time is desired a time delay relay 1TD producing the requisite time delay may be selected. To obviatie this problem, the circuitry of FIG. 3 may be modified so as to be triggered by the machine logic. In this embodiment, switch 72 would be closed at the end of the copy run by the machine logic and bell 94 would be energized a pre-selected duration of time after the copy run terminates. Hence, detecting means 84 includes a voltage source electrically coupled to a switch which is closed when an original document is disposed upon the platen of an electrophotographic printing machine or at the termination of the copy run. Closing of the switch actuates the timing means of the electrical circuitry to electrically excite an indicator upon the failure to remove the original document from the platen after the elapse of a pre-selected duration of time.

It is, therefore, apparent that there has been provided, in accordance with the present invention, an apparatus for housing an original document that indicates the failure to remove the original document therefrom after the elapse of a pre-selected duration of time. This apparatus fully satisfies the objects, aims and advantages set forth above. While this invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. An apparatus for housing an original document, including:

means for supporting the original document;

means for detecting the failure to remove the original document from said supporting means after the elapse of a preselected duration of time;

a cover member operatively associated with said supporting means and being movable from an opened position permitting the orignal document to be disposed on said supporting means to a closed position securing releasably the original document on said supporting means; and means for illuminating the original document disposed upon said supporting means.

2. An apparatus as recited in claim 1, wherein said detecting means includes:

a voltage source;

means for indicating the presence of the sheet of support material on said supporting means;

timing means for energizing said indicating means after the elapse of the pre-selected duration of time; and switch means operatively associated with supporting means and arranged to be actuated in response to the original document being located on said supporting means, thereby electrically coupling said voltage source to said timing means to energize said timing means.

3. An apparatus as recited in claim 2, wherein said supporting means includes:

a substantially rigid frame member having an aperture therein;

resilient means secured to said frame member on the periphery of the aperture therein; and a transparent member having a generally planar surface for supporting the original document in a light receiving relationship with said illuminating means, said transparent member being mounted on said resilient means in the aperture of said frame member.

4. An apparatus as recited in claim 3, wherein said cover member includes:

a substantially rigid outer shell; and a resilient sheet member secured to said outer shell and adapted to engage the original document disposed on said transparent member with said cover member being in the closed position.

5. An electrophotographic printing machine of the type having a corona generating device for charging a photoconductive member to a substantially uniform potential, and an exposure mechanism for illuminating an original document forming a light image which irradiates the charged photoconductive member recording a latent image thereon, wherein the improvement includes:

means for supporting the original document;

means for detecting the failure to remove the original document from said supporting means after the elapse of a preselected duration of time;

a cover member operatively associated with said supporting means and being movable from an opened position permitting the original document to be disposed on said supporting means to a closed position securing releasably the original document on said supporting means.

6. A printing machine as recited in claim 5, wherein said detecting means includes:

a voltage source;

means for indicating the presence of the sheet of support material on said supporting means;

timing means for energizing said indicating means after the elapse of the pre-selected duration of time; and switch means operatively associated with said supporting means and arranged to be actuated in response to the original document being located on said supporting means, thereby electrically coupling said voltage source to said timing means to energize said timing means.

7. A printing machine as recited in claim 6, wherein said supporting means includes:

a substantially rigid frame member having an aperture therein;

resilient means secured to said frame member on the periphery of the aperture therein; and a transparent member having a generally planar surface for supporting the original document in a light receiving relationship with said illuminating means, said transparent member being mounted on said resilient means in the aperture of said frame member.

8. A printing machine as recited in claim 7, wherein said cover member includes:

a substantially rigid outer shell; and a resilient sheet member secured to said outer shell and adapted to engage the original document disposed on said transparent member with said cover member being in the closed position.

* * * * *